United States Patent
Naraoka et al.

[11] Patent Number: 5,914,161
[45] Date of Patent: Jun. 22, 1999

[54] PACKAGING MATERIAL FOR A PHOTOGRAPHIC MATERIAL

[75] Inventors: Naohito Naraoka; Yasuhisa Kanezashi, both of Odawara, Japan

[73] Assignee: Konica Corporation

[21] Appl. No.: 08/661,632

[22] Filed: Jun. 11, 1996

[30] Foreign Application Priority Data

Jun. 29, 1995 [JP] Japan .................................. 7-163924

[51] Int. Cl.$^6$ .............................. B32B 27/32; G03C 3/00
[52] U.S. Cl. ..................... 428/35.7; 428/35.2; 428/333; 428/339; 428/516; 206/524.2; 430/536; 430/961
[58] Field of Search ................... 428/35.2, 523, 428/35.7, 333, 339, 516; 206/524.2; 430/536, 961

[56] References Cited

U.S. PATENT DOCUMENTS

| | | | |
|---|---|---|---|
| 4,147,291 | 4/1979 | Akao et al. | 428/461 X |
| 4,258,848 | 3/1981 | Akao et al. | 428/461 X |
| 4,663,218 | 5/1987 | Akao | 428/523 X |
| 5,017,429 | 5/1991 | Akao | 428/349 |
| 5,026,594 | 6/1991 | Akao | 428/220 |
| 5,055,344 | 10/1991 | Naraoka | 428/213 |
| 5,075,163 | 12/1991 | Akao | 428/323 |
| 5,234,750 | 8/1993 | Akao | 428/219 |
| 5,272,236 | 12/1993 | Lai | 526/348.5 |
| 5,384,173 | 1/1995 | Akao | 428/35.7 |
| 5,629,059 | 5/1997 | Desai | 428/34.9 |
| 5,677,383 | 10/1997 | Chum | 525/240 |

FOREIGN PATENT DOCUMENTS 0597502  5/1994  European Pat. Off. .

*Primary Examiner*—Fred Teskin
*Attorney, Agent, or Firm*—Jordan B. Bierman; Bierman, Muserlian and Lucas

[57] ABSTRACT

Disclosed is a packaging material for a light-sensitive material, said packaging material comprising a multi-layered structure, wherein said multi-layered structure comprising a layer, said layer containing a polyethylene having a molecular weight distribution of 1.5 to 2.4 in an amount of 20 to 90% by weight of said layer.

7 Claims, 3 Drawing Sheets

PACKAGING MATERIAL FOR A PHOTOGRAPHIC MATERIAL

FIELD OF THE INVENTION

The present invention relates to a packaging material for light-sensitive material, and more particularly relates to a packaging material for light-sensitive material composed of a laminated material having two or more layers, mainly made of polyethylene, containing at least one light-shielding layer.

BACKGROUND OF THE INVENTION

In a packaging material for light-sensitive material, for a barrier material having a dehumidifying function and light-shielding property, various technologies have been developed for keeping physical strength, dehumidifying and light-shielding properties.

For keeping strength, materials described in Japanese Patent Publication Open to Public Inspection (hereinafter, referred to as "Japanese Patent O.P.I. Publication") Nos. 237640/1986, 181944/1987 and 283944/1988 and Japanese Utility Publication Open to Public Inspection No. 25538/1987 are cited. As a packaging material using a straight-chained low-density polyethylene (LLDPE) having excellent film physical property, materials described in Japanese Patent O.P.I. Publication Nos. 18547/1987, 289548/1988, 290741/1988, 270535/1989, 946341/1989, 64537/1990, 146539/1990 and 196238/1990 are known. In addition, with regard to the light-shielding property, light-shielding materials preferably used for a light-shielding layer are described in Japanese Patent O.P.I. Publication Nos. 85539/1988, 82935/1989, 209134/1989, 94341/1989, 165140/1990 and 221956/1990. With regard to the dehumidifying property, packaging materials using aluminum foil or depositing metal layers are described in Japanese Patent O.P.I. Publication Nos. 77532/1989, 251031/1989, 186338/1990 and 17825/1990. In addition, materials considering an dust shielding property is known in Japanese Utility Publication No. 35540/1991.

The above-mentioned packaging materials include a tube type and sheet types composed of several multi-layered structure.

The tube type packaging material can be easily manufactured by means of the inflation method. Namely, molten polyethylene containing carbon black is extruded from a disc die mounted on an extruder. Inside the extruded tube type film, air is blown so that the film is gradually swollen up to a prescribed diameter. When the extruded film is chilled and solidified, it is folded by means of a guide roll or a nip roll, and is then wound. Thus, a continuous tube is obtained. The resulting continuous tube is cut to appropriate lengths, and concurrently with this, one side of the cut end is sealed by means of heat-sealing or folded by means of heat press or adhesive tape. Thus, an envelope is obtained. Into this envelope, a light-sensitive material is inserted through the open end manually, and then, the open end is sealed with a heat press or adhesive tape to obtain a packaging material.

It is necessary for the above-mentioned tube type packaging material to be prepared for each envelope width. Since the kind and the size of light-sensitive material products are very varied and suitable clearance of envelopes housing such products are fixed, accordingly, the number of envelope sizes becomes large, for which tubes of many width sizes must be prepared. Accordingly, there occurs a problem that productivity is lowered and inventory control becomes complex. More serious, however, is that, firstly, automatic packaging is difficult and, secondly, it is difficult to provide added value such as strength-enhancing and dehumidifying property so that protection for the light-sensitive material is insufficient.

Accordingly, sheet type packaging materials composed of several multi-layered structure are commonly used. As the above-mentioned sheet type packaging materials, those having a laminated layer structure and each layer having a specific function, as shown in FIGS. 1 through 5 are preferably employed. The above-mentioned sheet type packaging materials have an outer heat-durable layer so that the sheet can be subjected to heat sealing by means of a heat press for facilitating to make a tube shape. If the packaging material is too wide width, it can be cut as appropriate before or after preparing the tube. Therefore, it can be used for packaging materials having different sizes as desired. Therefore, it is preferable in terms of inventory control and productivity.

Paper (unbleached, semi-bleached and fully-bleached kraft paper) is cited as a typical material used for the heat-durable layer. Those whose weight is 45–190 g/m$^2$, and those whose weight is 50–90 g/m$^2$ are preferred from viewpoint of envelope-finishing property and strength. In addition to paper, resin films, such as polyethylene terephthalate, nylon and polypropylene, which has higher heat-strength compared to a heat-sealed can be used for the heat-durable layer.

Among layer laminations wherein functional layers are adjacent to each other, layer lamination, having a lamination layer, as shown in FIGS. 1 through 4 are layer laminations wherein the lamination layer(s) adhered between each functional layer. The lamination layer can be formed by means of an extrusion lamination method, a dry lamination method, a wet lamination method and a hot melt lamination method. When layer lamination is made of resin films, the extrusion lamination method or the dry lamination method are commonly used. In FIG. 5 is a layer lamination is directly molten by superposed molten extrusion.

Functions of light-shielding, strength-enhancing and heat-melting which are essential for the packaging material for light-sensitive material may be shared by each layer. However, if either of the light-shielding function or the strength-enhancing function is destroyed, it leads to the destruction of all functions of the packaging material. Therefore, in terms of strength of the packaging material, it is preferable that one layer has both functions. Therefore, the light-shielding, strength-enhanced and heat-sealed in FIGS. 1 through 4 exhibits a layer having functions of light-shielding, strength-enhancing and heat melting functions. The intermediate light-shielding and strength-enhanced layer in FIG. 5 exhibits a layer having functions of light-shielding and strength enhancing. For the above-mentioned layer wherein functions of light-shielding and strength enhancing are concentrated, a sheet formed by being cut with a cutter before a black polyethylene tube containing carbon black is wound can be employed as a major constituting material capable of being produced most simply.

In FIG. 1, the layer lamination of the heat-durable layer and the lamination layer is separated from a single light-shielding, strength-enhanced and heat-sealed. This is a constitution in which two laminated sheets and a single layer sheet are symmetrically superposed on the upside and downside of the light-sensitive material packaged and heat melting occurs between the laminated sheets and the single sheet due to the lamination layer when finishing the envelope due to heat press. Since two sheets of the envelope wall of the resulting packaging product can extend independently, they easily absorb shock so that the packaging product is resistant to impact or tearing. On the contrary, however, there is the shortcoming that production loss easily occurs when finishing the envelope.

The above-mentioned sheet type packaging materials composed of several layers lamination have satisfied requests in terms of strength, function and control to some extent. However, there are major shortcomings in terms of recycling or incinerating the materials. Namely, the film raw materials of each layer constituting the laminated sheet, such as the heat-durable layer, the lamination layer, the dehumidifying layer, the light-shielding and strength-enhancing, the heat-sealed and the light-shielding, strength-enhancing and heat-sealed, are all different from each other. Consequently, the separation is so difficult that recycling is difficult. In addition, when metals such as aluminum are used for the dehumidifying layer, metal dust remains when the packaging product is incinerated.

The present inventors proposed a packaging material for light-sensitive material composed of at least three laminated layers, mainly made of polyethylene, containing at least one light-shielding layer, in which recycling can be conducted without need of separating each layer, which were disclosed in Japanese Patent O.P.I. Publication No. 75339/1994 and Japanese Patent Application No. 16020/1995. The packaging material for light-sensitive material have satisfied requests in terms of strength-enhancing, functions and control to some extent. However, it turned out that there are still problems in terms of physical strength during transportation requested from viewpoint of further severe transportation circumstances.

SUMMARY OF THE INVENTION

The present invention was made based on the above-mentioned background. Its objects include to provide a packaging material for light-sensitive material employing a film layer, composed of two or more laminated layers, including at least one light-shielding layer, which is made mainly of polyethylene, which can be recycled without need of separating each laminated layer and also to provide a packaging material capable of sufficiently meeting further severe transportation conditions.

The present inventors continued study to improve the strength of a packaging material for light-sensitive material, composed of three or more layers which is mainly made of polyethylene, which had been invented by the present inventors in advance. As a result, the present inventors attained the present invention by discovering that, by the use of polyethylene of molecular weight distribution of 1.5 to 2.4 in at least one layer of the laminated layers mainly made of polyethylene, a dart shock test of 50% damage mass, measured by JIS K-7124 (1987) Method A or Method B, which is recognized to correspond with physical strength during actual transportation is improved.

Therefore, the objects of this invention are achieved by the following items.

Item 1: A packaging material for a light-sensitive material, said packaging material comprising a multi-layered structure, wherein said multi-layered structure comprising a layer, said layer containing a polyethylene having a molecular weight distribution of 1.5 to 2.4 in an amount of 20 to 90% by weight of said layer.

Item 2: The packaging material of item 1, wherein said multi-layered structure has a thickness of 40 to 150 μm.

Item 3: The packaging material of item 1, wherein said polyethylene has a density of 0.890 to 0.925 g/cm$^3$.

Item 4: The packaging material of item 1, wherein said polyethylene has a melt-index of 0.02 to 2.00 g/10 minutes.

Item 5: The packaging material of item 1, wherein said layer contains said polyethylene in an amount of 45 to 90% by weight of said layer.

Item 6: The packaging material of item 1, wherein said multi-layered material contains an outermost layer as a heat-resistant layer, and an innermost layer as a heat-sealing layer.

Item 7: A packaging material for a light-sensitive material, said packaging material comprising a multi-layered structure having a polyethylene in an amount of not less than 70% by weight, wherein said multi-layered structure contains an outermost layer as a heat-resistant layer, an intermediate layer and an innermost layer as a heat-sealing layer, wherein said intermediate layer has a thickness of 40 to 150 μm, and said intermediate layer has a polyethylene having a molecular weight distribution of 1.5 to 2.4, a density of 0.890 to 0.925 g/cm$^3$ and a melt index of 0.02 to 2.00 g/10 minutes, in an amount of 45 to 90% by weight of said intermediate layer.

Figure 1:
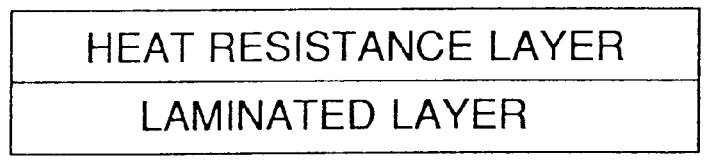
FIG. 1 is a sectional view of an example of a packaging material of the present invention.
Figure 2:
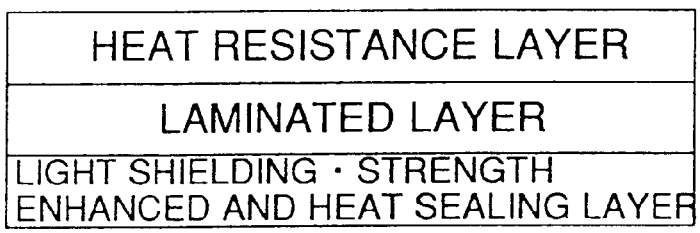
FIG. 2 is a sectional view of another example of a packaging material of the present invention.
Figure 3:
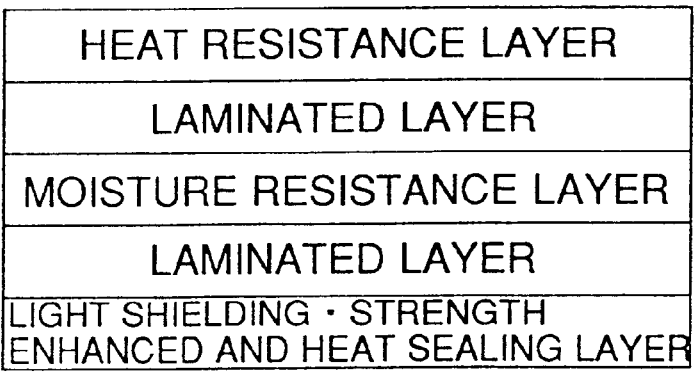
FIG. 3 is a sectional view of a still another example of a packaging material of the present invention.

EXPLANATION OF NUMERALS 1, 6 and 9: Packaging materials
2: Hot melt
3: A roll of light-sensitive material
4: Label
5: Opening-securing tape
7: Cardboard sheet
8: Sheets of light-sensitive material
10: Heat-sealed portion

DETAILED DESCRIPTION OF THE INVENTION

The present invention is a packaging material for light-sensitive material formed by film layers composed of laminated material in which at least two or more polyethylene layers are laminated and at least one or more light-shielding layers are contained, wherein at least one of the above-mentioned polyethylene layers is constituted by polyethylene having a molecular weight distribution of 1.5 to 2.4. Due to this constitution, the above-mentioned objects can be attained.

Hereunder, constitution of the practical aspect of the packaging material for light-sensitive material of the present invention will now be explained.

The packaging materials for light-sensitive material of the present invention include those only structured with a laminated film with polyethylene mainly and those laminated with a heat-durable layer, compared to paper or polyethylene, such as a heat-durable thermo-plastic resin layer and also laminated with a dehumidifying layer using aluminum foil or deposited layer. However, in the latter type, additional functional layer(s), such as a heat-durable layer, are sealed and superposed on the former laminated film as shown in FIGS. 1 through 4 according to special needs. Therefore, the former type is mainly used.

Figure 6:
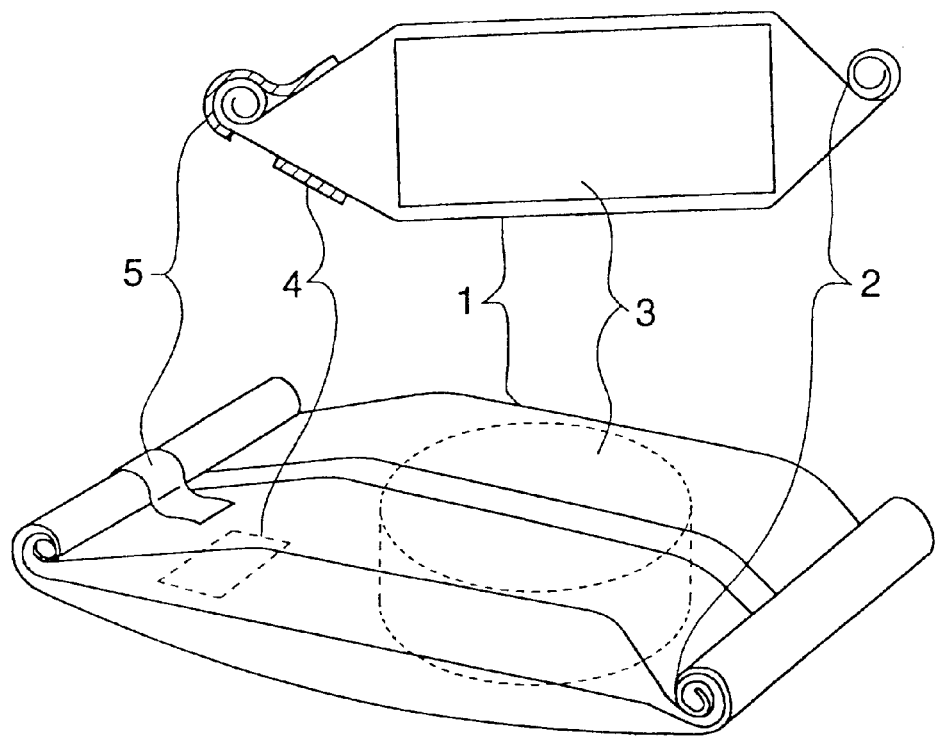
FIG. 6 is a perspective view of yet one more example of a packaging material of the present invention.

Namely, except when a packaging material is subjected to specially severe conditions, a packaging material composed only of a laminated film having 60–250 $\mu$m thickness and preferably having 130–170 $\mu$m can sufficiently satisfactorily used. It is apparently superior to a packaging material of numerous laminated other layers, in terms of cost, handling property and recycling property. If the thickness of the above-mentioned laminated film is less than 60 $\mu$m, the film has weak stiffness so that handling property when packaging a film in an envelope becomes poor, causing frequent occurrence of loss. In addition, when the thickness of the film exceeds 250 $\mu$m, stiffness of the film becomes too strong so that the envelope-manufacturing process and the operation wherein a light-sensitive material product is inserted into an envelops for folding the envelope and for sealing, as shown in FIG. 6, becomes impractical. In addition, since heat capacity is so large that heat transfer is delayed. As a result, as shown in FIG. 7, it is difficult to adhere the envelope with a heat seal in an envelope-manufacturing process and packing process.

In the present invention, numerals 1, 6 and 9 show a packaging material, of the present invention, composed of a laminated film. Numeral 2 shows a hot melt adhesive agent. Numeral 3 shows a disc-shaped roll light-sensitive material, numeral 4 shows a label. Numeral 5 is an envelope-securing tape. Numeral 7 is a cardboard. Numeral 8 shows sheets of light-sensitive material. Numeral 10 shows a heat sealed portions.

Figure 5:
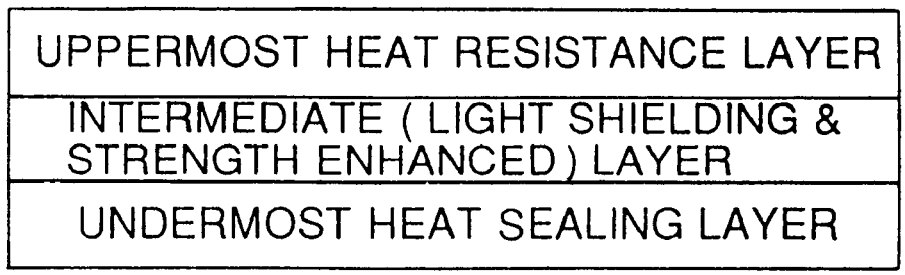
FIG. 5 is a sectional view of a still further another example of a packaging material of the present invention.
Figure 7:
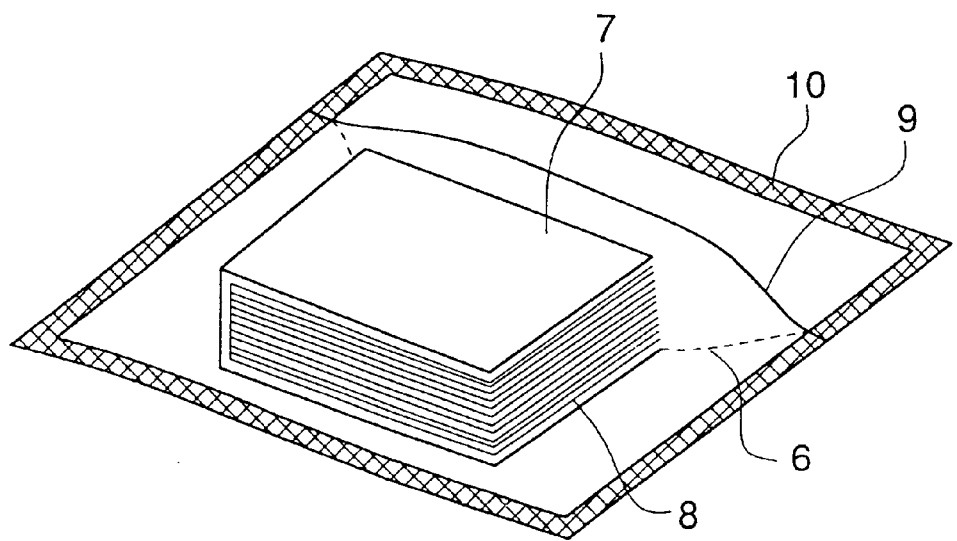
FIG. 7 is a perspective view of a final example of a packaging material.

In the laminated film, a function of heat-durable layer is requested to the outermost layer and a function of a heat-sealed layer is requested to the innermost layer, in order to facilitate envelope-manufacturing processing as shown in FIG. 6 and packing processing as shown in FIG. 7. Therefore, it is preferable that the above-mentioned laminated film has a lamination layer structure as shown in FIG. 5 wherein strength-enhancing and light-shielding function, which are requested as a packaging material for light-sensitive material in addition to heat-resistance and heat seal, are assigned to the intermediate layer, aforesaid intermediate layer comprises a lamination of a strength-enhancing layer and a light-shielding layer or a lamination layer structure in which aforesaid intermediate layer has a function of anti-static in addition to functions of strength-enhancing and light-shielding. In this case, it is necessary for the outermost layer and the innermost layer respectively to have layer thickness of 10 $\mu$m or more in order to satisfy the functions of the heat-durable layer and a heat-sealed layer. In addition, it is necessary for the intermediate layer to have layer thickness greater than that of the outermost layer or the innermost layer in order to satisfy the functions of strength-enhancing and light-shielding. In addition, it is demanded to set the thickness of laminated layer film to be in the range of 60–250 $\mu$m. Therefore, it is preferable that the thickness of the outermost layer and the innermost layer are respectively between 10 to 50 $\mu$m, and preferably between 10–30 $\mu$m. In addition, it is also preferable that the proportion between the outermost layer, the intermediate layer and the innermost layer is in the range of 1:5:1–1:2:1. In addition, it is additionally preferable that the overall thickness of the laminated film is in the range of 60 to 250 $\mu$m, and the above-mentioned intermediate layer has a thickness of 40 $\mu$m to 150 $\mu$m.

The outermost layer is requested to use polyethylene of 70 wt % or more in terms of recycling property and processing suitability. Since the outermost layer is important as a heat-durable layer, for polyethylene, it is suitable to use middle or high density polyethylene, wherein density is 0.93–0.95 g/cm$^3$ and a melt index is 0.02–0.05, which has relatively heat-durable property. If the density of aforesaid middle or high density polyethylene is less than 0.93 g/cm$^3$, heat-durable strength becomes insufficient, and if it exceeds 0.95 g/cm$^3$, dart impact strength, which is 50% destructive mass in dart shock test calculated in Methods A or B in JIS K-7124 (1987) which is recognized to correspond to physical strength during transportation requested to the packaging material, is lowered. In addition, when the melt index is lower than 0.02, the molding property becomes deteriorated. On the contrary, when it exceeds 0.05, the dart impact strength is lowered.

The above-mentioned melt index value is a measurement value calculated based on "Polyethylene Test Methods" in JIS K6760, under conditions of test temperature of 190° C. and a test load of 2.16 kg weight which are described in JIS K7210 (1976), "Flow Test Method of Thermo-plastics", Table 1, Condition 4. In addition, it is preferable that the above-mentioned middle or high density polyethylene is 40–80 wt % of polyethylene in the outermost layer. If the middle or high density polyethylene is less than 40 wt % thereof, heat-resistance becomes inferior. If the middle or high density polyethylene exceeds 80 wt %, the dart impact strength is deteriorated.

Straight-chained low-density polyethylene, which is excellent in shock resistance, is preferable for polyethylene in the outermost layer or in the intermediate layer other than the above-mentioned middle or high density polyethylene. The above-mentioned straight-chained low-density polyethylene is prepared by copolymerization ethylene and $\alpha$ olefin incorporating hot melting carbon atoms of 3–20. A aforesaid $\alpha$ olefin, propylene, 1-butene, 1-pentene, 1-hexene, 4-methyl-1-pentene, 1-octene, 1-decene, 1-tetracene and 1-octadecene are cited. Of these, $\alpha$ olefin having carbon atom of 30–60 wt % is preferable in terms of improving shock resistance and stable casting properties. The content of $\alpha$ olefin is preferably 30–60 wt %, and specifically 40–60 wt %.

According to the prior invention of the present inventors filed in advance, the dart impact strength, of the laminated film, which relates to shock resistance of the above-mentioned polyethylene was allowed to be 800 g or more and preferably 1000 g or more from both of the outermost layer and from the innermost layer in accordance with Method A of JIS K7124, while the dart impact strength of 800 g or less caused breakage or hole in the packaging material during actual transportation. However, since then, transportation circumstances have changed drastically so that the above-mentioned index has become insufficient. The present inventors continued laborious studies to find that strength of the measurement limit or more in Method A is necessary and that 800 g or more in Method B does not result in breakage or holes. In addition, with regard to the simulated transportation evaluation, it has been apparent that a conventional vertical vibration method stipulated by NSTA, vibration frequency of 7 Hz, gravity acceleration of 1.0 G, at a vibration duration of 35 minutes and vibration number of 14700 cannot reproduce actual transportation conditions so that a more severe simulation is necessary. The present invention evaluated each packaging material under vibration number of 16.5 times larger than the designated number and a doubled gravity acceleration, i.e., under 33 times as severe as the designated status. In addition, assuming dropping of the package material during transportation, drop tests were also evaluated at a more severe rate than Level I.

In order to obtain a multi-layered film having the above-mentioned dart impact strength, it is preferable that 20 wt % to 90 wt % of polyethylene whose molecular weight distribution of 1.5 to 2.4 is contained in at least one of the layers, and preferably, 38 wt % to 90 wt %, more preferably, 45 wt % to 90 wt % of the polyethylene is contained in at least one of the layers. If any layer in the laminated film does not use polyethylene whose molecular weight distribution of 2.4 or less, or if, even when the above-mentioned condition is satisfied, the amount of it is less than 20 wt % of polyethylene, it is almost impossible to obtain the dart impact strength of 800 g or more in Method B in the same manner as in the above-mentioned laminated film of the prior art.

If it exceeds 90 wt %, it is difficult to add sufficient light-shielding material(s). It is also difficult to add additives for regulating layer-forming conditions (uniformity of thickness, solubility of resins and fluidity of the layer). Therefore, it is nearly impossible to obtain a stable film. Accordingly, the raw material for packaging material is unsuitable if the it exceeds 90 wt %.

It is difficult to manufacture packaging materials using materials whose molecular distribution is less than 1.5 due to the control of reactivity point using a catalyst. In such occasions, the productivity is lowered and the resin becomes extremely expensive so that such materials become unsuitable for the raw material of packaging material.

In terms of obtaining satisfied dart impact strength, it is preferable to use low-density polyethylene, having density of 0.890–0.925 g/cm$^3$ wherein strength can easily obtained among various types of polyethylene, whose molecular weight distribution is 1.5 to 2.4.

The molecular weight distribution of polyethylene can be obtained by measurement by means of a gel permeation chromatography method and an operation of "molecular weight distribution=(Average molecular weight by weight (Mw))/(average molecular weight by number (Mn)).

The molecular weight distribution of polyethylene was measured by means of a gel-permeation chromatography method. As the measurement condition, a column wherein porous gel having hole size of $10^3$Å–$10^6$Å pores over which polystyrene and divinylbenzene were pored was swelled with a solvent of 1,2,4-trichlorobenzene. The temperature inside the column during measurement was kept at 140° C. The material was flowed out at a solvent flowing-out flow rate of 1 ml/min. and the speed of which was sensed by the use of a differential refractometer.

As a standard measurement substance, standard polystyrenes were employed.

The molecular weight distribution can be calculated from the above-mentioned measurement and an operation in which:

molecular weight distribution = [average molecular weight by weight $(M_w)$] / [average molecular weight by number$(M_n)$].

The light-shielding layer may be provided in any layer, such as, in the innermost layer or in plural layers as shown in FIGS. 1 through 4, not limited to the intermediate layer as shown in FIG. 5. However, it is preferable to exclude the innermost layer which directly contacts the light-sensitive material. In addition, the light-shielding layer may be a deposited layer or a layer containing a light-shielding material(s). The material for light-shielding is not specifically limited. It includes carbon black, iron oxide, titanium oxide, aluminum powder, aluminum paste, calcium carbonate, barium sulfate and organic and inorganic pigments. Of these, carbon black is preferable in terms of light-shielding effect and dispersion property.

For the inner-most layer, a low-density polyethylene, capable of being sealed at a low temperature, which can cope with temperature change to a certain extent and has good sealing strength, is preferable. Specifically, polyethylene having a density of 0.920 g/cm$^2$ is preferable.

Due to the laminated film composed of the lamination of the above-mentioned functional layers, the objects of the present invention can be attained. However, considering the cost, processing property, handling property as a packaging material and recycling ability of the packaging material of the present invention, it is preferable that the following performances should be provided.

It is desirable that the friction coefficient of the outermost layer and that of the innermost layer of the laminated film is in the range of 0.15–0.50 and preferably 0.20–0.40. If the friction coefficient of the outermost layer is less than 0.15, when packaging materials are stack, they easily slip and thereby cannot be stacked. If the friction coefficient of the innermost layer is less than 0.15, when conducting automated inner-packaging, slippage of the product inside occurs, preventing stable automatic inner-packaging. In addition, if the friction coefficient of the outermost layer or that of the innermost layer are larger than 0.50, when positioning the packaging material during the envelope-finishing process, it is difficult to slip so that loss easily occurs. The above-mentioned friction coefficient can easily be controlled with inexpensive cost by combining polyethylene with suitable lubricants, anti-blocking agents or anti-oxidizing agents.

Differences between friction coefficients due to the differences of the kinds of polyethylene are as follows. Ordinarily, middle- or high-density polyethylene has a higher lubricating value. Low-density polyethylene, specifically, straight-chained low-density polyethylene has a lower lubricating value. In addition, it is common practice that the outermost layer satisfies the above-mentioned range of friction coefficient by the use of the above-mentioned polyethylene and that the innermost layer requires mixing with additives and control them. However, if the friction coefficient of only the innermost layer is controlled, bleed-out of the additives occurs over time, i.e., shifting of the additives on the layer occurs so that the friction coefficient easily changes. Accordingly, it is necessary to control plural layers including the adjacent layer. When thinking the balancing of the friction coefficient of the outermost layer and that of the innermost layer, taking the control of the friction coefficient between the inner-most layer and the outermost layer and shifting of the additives into consideration, it is preferable that the friction coefficient of the innermost layer is slightly higher than that of the outermost layer. The difference is desirably 0.02–0.10 and preferably 0.03–0.07.

Incidentally, packaging of the light-sensitive materials is ordinarily conducted in a dark room. Therefore, considering the packaging operability, it is not preferable that the color of the outermost layer, which can be seen from the surface side of the packaging material, is a light-absorptive color. It is preferable that the outermost layer contains pigments of the light reflective color or a light-reflective layer is printed thereon. It is desirable that the degree of reflection of the above-mentioned outermost layer is determined synthetically from the viewpoint of dark room grade, cost, physical properties and design of the packaging material. However, from the viewpoint of recycling, it is preferable that the amount of both of pigments and printing inks is minimized. Incidentally, as described above, the outermost layer of the packaging material is preferably reflective. However, it is preferable that the color of the innermost layer is light-absorptive in terms of comparison.

Considering recycling, that the materials other than for the laminated film of the packaging material are also close to the material of the laminated film is helpful for in that it is not necessary to separate materials when disposing of them or for the improvement in reproduction purity after recycling. Namely, a hot melt used for the envelope-finishing processing is not preferably a rubber-containing type, but an acrylic resin type or more preferably a polyolefin-containing type is preferable. In addition, tapes and labels used for fixing the opening of the envelope are preferably composed of polyethylene. In addition, it is also preferable not to use unnecessary materials.

Next, a forming method of each layer of the laminated film will now be explained. Methods wherein the outermost layer, the intermediate layer and the innermost layer are separately formed by means of either of an inflation method, a casting method, a T-die method, a calendaring method or an orientation method and the resulting layers are laminated by means of an extrusion method, a dry method, a wet method or a hot melt lamination method can be adopted. With regard to lamination, it is preferable to employ an extrusion lamination method using polyethylene, from the viewpoint of enhancing the purity of the polyethylene.

In addition, if economical merit is pursued, it is preferable to laminate the outermost layer, the intermediate layer and the innermost layer with the least possible number processes. Therefore, it is preferable to adopt a co-extrusion inflation method, a co-extrusion casting method, a co-extrusion T-die method, a co-extrusion calendar method or a co-extrusion orientation method for forming all or a part of the layers. The inflation method is specifically preferable in view that film width can be modified in small increments and that colored film can be easily and inexpensively be produced.

An intermediate layer as a strength-enhancing layer, is not specifically limited. However, it is preferable to utilize a technology conceived by the present inventors as described in Japanese Patent O.P.I. Publication Nos. 146539/1990 and 196238/1990. For example, a method wherein 5–25 wt % of ethylene-propylene rubber having Mooney's viscosity of 10+100 (ML 1+4 (100° C.)) and iodine number of 20 ($I_2$ g/100 g EPDM) or less is added (Japanese Patent O.P.I. Publication No. 146539/1990) can be utilized. In addition, for example, a laminated film wherein the orientation axis of two oriented films, composed of 20–50 wt % of a straight-chained low-density polyethylene having density of 0.870–0.930 g/cm$^3$ and having melt index of 0.1–10 g/10 min., 5–30 wt % of a middle-density polyethylene having a density of 0.931–0.949 g/cm$^3$ and having a melt index of 0.01–10 g/10 min. and 30–50 wt % of a high-density polyethylene having a density of 0.950 g/cm$^3$ or more and having a melt index of 0.01–0.5 g/10 min., which were subjected to 1.5 times mono-axial orientation obliquely at 45 degree are crossed (see Japanese Patent O.P.I. Publication No. 196238/1990) is used. In this occasion, this obliquely-oriented film (the intermediate layer) and the outermost layer were subjected to co-extrusion. In addition, this obliquely-oriented film (the intermediate layer) and the innermost layer were also subjected to co-extrusion. Following this, it is preferable in terms of economy that they are oriented and subjected to cross lamination.

In addition, in order to increase shock strength, it is preferable to increase the proportion of the above-mentioned straight-chained low density polyethylene and remove the high-density polyethylene, or to set the proportion of the above-mentioned straight-chained low density polyethylene to 40–70 wt % and also set the proportion of the high-density polyethylene to 30–60 wt %. In addition, it is also effective to add a strength-enhancing wherein ethylene-α olefin copolymer having a density of 0.900 g/cm$^3$ or less and also having a melt index of 3.0–5.0 g/10 min. to the above-mentioned 35–65 wt % of middle-density polyethylene and 25–55 wt % of straight-chained low density polyethylene, other than the above-mentioned two inventions. It is also preferable to form the above-mentioned strength-enhancing, the outermost layer, the intermediate layer and the innermost layer by the co-extrusion inflation method.

As a packaging product produced from the packaging material of the present invention, a roll-containing packaging product as shown in FIG. 6 and a sheet-containing packaging product as shown in FIG. 7 are exemplified. However, the form of the envelope, the position of heat sealing and whether there is folding on the envelope opening are not specifically limited.

EXAMPLE

Hereunder, examples will be shown practically together with comparative examples. Incidentally, major materials used in examples and comparative examples are collectively shown in Table 1.

TABLE 1

| Mark | Component | Density (g/cm$^3$) | Melt Index (g/10 min) | Distribution of molecular weight ($M_W/M_N$) |
|---|---|---|---|---|
| A | Middle-density polyethylene (MDPE) | 0.942 | 0.024 | 40.0 |
| B | Straight-chained low-density polyethylene (LLDPE) | 0.915 | 1.000 | 3.5 |
| C | Low-density polyethylene (LDPE) | 0.922 | 7.000 | 10.0 |
| D | Low-density polyethylene (LDPE) | 0.927 | 4.000 | 9.0 |
| E | Ultra-low-density polyethylene (ULDPE) | 0.907 | 3.000 | 3.5 |
| G | Straight-chained low density polyethylene (LLDPE) | 0.902 | 1.000 | 2.0 |

TABLE 1-continued

| Mark | Component | Density (g/cm³) | Melt Index (g/10 min) | Distribution of molecular weight (M_W/M_N) |
|---|---|---|---|---|
| H | Low-density polyethylene (LDPE) | 0.924 | 0.400 | 10.0 |
| I | Low-density polyethylene (LDPE) | 0.920 | 0.230 | 5.0 |
| K | Ultra-low-density polyethylene (ULDPE) | 0.905 | 0.800 | 5.0 |
| L | Straight-chained low density polyethylene (LLDPE) | 0.915 | 2.300 | 2.6 |
| M | Low-density polyethylene (LDPE) | 0.917 | 6.500 | 10.0 |
| N | High-density polyethylene (HDPE) | 0.964 | 3.000 | 20.0 |
|   |   |        | Mooney viscosity | iodine number |
| O | Ethylene-propylene-containing rubber | 0.860 | 90 | 15 |

Example 1

The outermost layer is a layer having 20 μm thickness composed of 65 wt % of middle-density polyethylene (A) wherein a density is 0.942 g/cm³ and a melt index is 0.024 g/10 min., 30 wt % of straight-chained low-density polyethylene (B) wherein a density is 0.915 g/cm³ and a melt index is 1.000 g/10 min., 3 wt % of low-density polyethylene (C) wherein a density is 0.915 g/cm³ and a melt index is 1.000 g/10 min. and 3 wt % of titanium oxide.

The intermediate layer is a layer having 100 μm thickness composed of 38 wt % of polyethylene (A), 38 wt % of a straight-chained low density polyethylene (G) wherein a density is 0.902 g/cm³ and a melt index is 1.000 g/10 min., 10 wt % of polyethylene (C), 9 wt % of ethylene-propylene-containing rubber (O) wherein a density is 860 g/cm³, Mooney viscosity is 90 (ML1+4 (100° C.)) and an iodine number is 15 (I₂g/100 g EPDM) and 5 wt % of carbon black.

The innermost layer is a layer having 20 μm thickness composed of 66.0 wt % of low-density polyethylene (H) wherein a density is 0.860 g/cm³ and a melt index is 0.400 g/10 min., 20.0 wt % of ethylene-propylene-containing rubber (O) and 14.0 wt % of polyethylene (C).

Using the above-mentioned 3 layers, a film-laminated packaging material, wherein the coefficient of dynamic friction of the outermost layer was controlled to 0.25 and that of the innermost layer was controlled to 0.30 by means of an anti-blocking agent and a slippage agent, was formed by means of a three-layer-co-extrusion inflation method.

Example 2

The outermost layer is a layer having 25 μm thickness composed of 57 wt % of polyethylene (A), 38 wt % of polyethylene (G), 2 wt % of polyethylene (C) and 3 wt % of titanium oxide.

The intermediate layer is a layer having 90 μm thickness composed of 40 wt % of polyethylene (A), 45 wt % of polyethylene (G), 10 wt % of polyethylene (C) and 5 wt % of carbon black.

The innermost layer is a layer having 25 μm thickness composed of 96.0 wt % of low-density polyethylene (I) wherein a density is 0.920 g/cm³ and a melt-index is 0.230 g/10 min. and 4.0 wt % of polyethylene (C).

Example 2 is the same as in Example 1 except for the above-mentioned layer structure.

Example 3

The outermost layer is a layer having 30 μm thickness composed of 47.5 wt % of polyethylene (A), 47.5 wt % of polyethylene (G), 2 wt % of polyethylene (C) and 3 wt % of titanium oxide.

The intermediate layer is composed of an intermediate layer on the outermost side and an intermediate layer on the innermost layer side. Both of the intermediate layers on the outermost side and the intermediate layer on the innermost layer side are respectively composed of 40 wt % of polyethylene (A), 45 wt % of polyethylene (G), 10 wt % of polyethylene (C) and 5 wt % of carbon black.

The innermost layer is a layer having 30 μm thickness composed of 86 wt % of polyethylene (H) and 14 wt % of polyethylene (C).

The above-mentioned outermost layer and the intermediate layer on the outermost side were subjected to co-extrusion, and the intermediate layer on the innermost layer side and the innermost layer were also subjected to co-extrusion. Both of them were subjected to 1.5 times mono-axial orientation so that a laminated films were structured. The above-mentioned 2 sheets of laminated films were faced each other in such a manner that the crossed axes angle of the orientation axis of each intermediate layers would be 90 degrees so that they were laminated with a 10 μm thickness layer composed of low-density polyethylene (M) wherein a density was 0.917 g/cm³ and a melt index was 6.500 g/10 min. to obtain a laminated layer film of packaging material. Except for this, Example 3 is the same as Example 1.

Example 4

A sample of Example 4 was the same as Example 2 except that the thickness of the outermost layer was 20 μm, that of the intermediate layer was 80 μm, that of the innermost layer was 20 μm and each of the above-mentioned layers were coated respectively by means of an inflation method and are subjected to extrusion lamination with polyethylene (M) having 10 μm thickness for forming a laminated film of a packaging material.

Example 5

Figure 4:
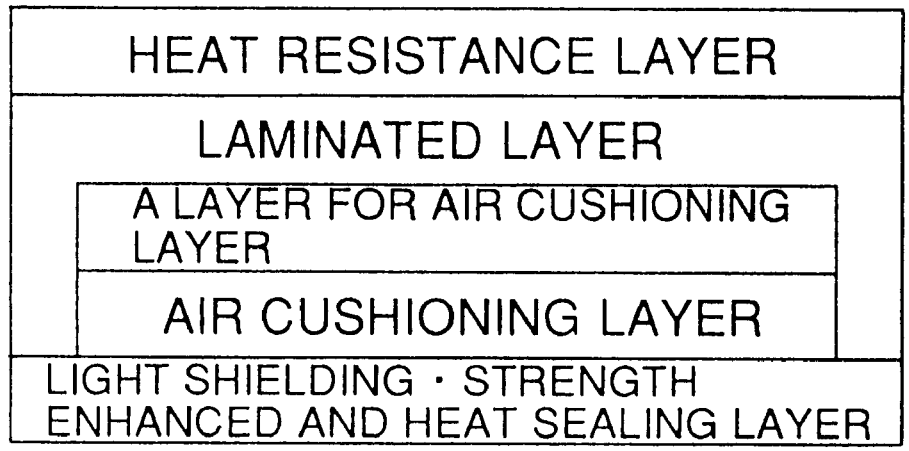
FIG. 4 is a sectional view of a yet another example of a packaging material of the present invention.

A 30 μm thickness film for forming an air-cushion layer composed of 100 wt % of low-density polyethylene (D) having a density of 0.927 g/cm³ a melt index of 4.000 g/10 min. formed on an unbleached kraft paper wherein the width of aforesaid film was narrower than aforesaid unbleached kraft paper and a film having 10 μm thickness in the same manner as in the intermediate layer in Example 1 were laminated with a 15 μm polyethylene (M) layer so that a packaging material with layer lamination in the same manner as in FIG. 4 was obtained. This was used in the same manner as in Example 1.

Example 6

A film having 100 μm thickness in Example 5 was subjected to co-extrusion using the same material as in the intermediate layer in Example 3, and it was subjected to 1.5 times mono-axial orientation so that two films were obtained. The above-mentioned 2 sheets of films were laminated with a polyethylene layer (M) having 10 μm thickness in such a manner that the crossed axes angle of the orientation axis of each intermediate layers would be 90 degrees. Except for this, Example 6 is the same as in Example 5.

Comparative Example 1

Samples of Comparative example 1 were the same as in Example 1 except that polyethylene (G) in the intermediate layer was changed to polyethylene (B) and the innermost layer was a layer composed of 100 wt % of ultra-low-density polyethylene (E) wherein the density was 0.907 and melt index was 3.000 g/10 min.

Comparative Example 2

Samples of Comparative Example 2 were the same as Example 2 except that polyethylene (G) in the outermost layer and the intermediate layer was changed to a layer composed of 100 wt % of ultra-low-density polyethylene (E) wherein a density was 0.905 and a melt index was 0.800 g/10 min.

Comparative Example 3

Samples of Comparative Example 3 were the same as in Example 3 except that polyethylene (G) in the outermost layer and the intermediate layer was changed to a layer composed of 100 wt % of straight-chained low-density polyethylene (E) wherein a density was 0.915 and a melt index was 2.300 g/10 min.

Comparative Example 4

Samples of Comparative Example 4 was the same as in Comparative example 2 except that the thickness of the outermost layer was 20 μm, that of the intermediate layer was 80 μm, that of the innermost layer was 20 μm and each of the above-mentioned layers were formed respectively by means of an inflation method and were subjected to extrusion lamination with polyethylene (M) having 10 μm thickness for forming a laminated film of a packaging material.

Comparative Example 5

Samples of Comparative Example is the same as in Example 5 except that the structure of the film having 100 μm thickness was that same as that of the intermediate layer in Comparative Example 1.

Comparative Example 6

A film having 100 μm thickness in Example 5 was subjected to co-extrusion using the same material as in the intermediate layer in Comparative Example 2, and it was subjected to 1.5 times mono-axial orientation so that two films were obtained. The above-mentioned 2 sheets of films were laminated with a polyethylene layer (M) having 10 μm thickness in such a manner that the crossed axes angle of the orientation axis of each intermediate layers would be 90 degrees. Except for this, Comparative Example 6 was the same as in Example 5.

Tables 2 and 3 show the results of each evaluation test for packaging materials obtained in the above-mentioned Examples and Comparative examples. Evaluation test conditions in Tables 2 and 3 are as follows:

Dart test: Representing 50% destructive mass by means of JIS-K-7124 Methods A and B.

Vibration test: In accordance with JIS-Z-0200 and JIS-Z-0230, the direction was vertical, the gravity acceleration was 2.0 G, frequency was 22.5 Hz, number of vibration was 243,000 times and vibration duration was 180 minutes. Packaging form and its evaluation method are described below.

Drop test: In accordance with JIS-Z-0200 and JIS-Z-0202, the material was dropped from Level I of 80 cm with 2–3 edge and one surface. Packaging form and its evaluation method are described below.

Type of packing: A core holder (a device for preventing crushing of a paper tube) was inserted into a paper tube portion of Konica Color Paper QA (glossy surface), 152 mm×175 m. This paper tube was inserted into an envelope wherein the width of 260 mm×gazette width of 160 mm×length of 580 mm, which was sealed with a tape after folding 2 and half times. As shown in FIG. 6, the opening of the envelope was sealed with a tape. The bottom portion was adhered with acrylic resin hot melt 2. On a label made of high-density polyethylene (N) having density of 0.964 g/cm$^3$ and a melt index of 3.000 g/10 min., essential data were recorded. In addition, the opening of the packaging product was secured and sealed with a mouth-sealing tape 5 made of polyethylene (N).

Evaluation methods for vibration test and drop test:

Whether there are scratches after the test was checked visually. Following this, the photographic paper was subjected to light of each level so that whether there is fogging was checked by means of photographic processing.

D: When the photographic paper is subjected to exposure to 3000 Lux light for 3 hours, pin hole type fogging occurred.

C: When the photographic paper is subjected to exposure to 100,000 Lux light for 3 hours, pin hole type fogging occurred.

B: Though scratches occurred, no fogging occurred.

A: No scratches occurred.

Recycling property:

A: It is possible for this product to be recycled

D: It is difficult for this product to be recycled.

Material used: From viewpoint of material saving, constituting materials, sizing of packaging materials and thickness were recorded.

Number of cost/process:

A process for forming one layer was determined to be "one process".

Cost ratio: It was represented by a relative ratio of the envelope size of the packaging material of Comparative example 1 when the above-mentioned type of packing was defined as 100.

TABLE 2

| Evaluation Item | Example 1 | Example 2 | Example 3 | Example 4 | Example 5 | Example 6 |
|---|---|---|---|---|---|---|
| Dart Method A | | | | | | |
| Outside | 1100 or more | 1100 or more | 1100 or more | 1100 or more | 900 | 900 |
| Inside (g) | 1100 or more | 1100 or more | 1100 or more | 1100 or more | 1100 or more | 1100 or more |
| Dart Method B | | | | | | |
| Outside | 900 | 900 | 1000 | 950 | 400 | 400 |
| Inside (g) | 900 | 900 | 1000 | 950 | 1000 | 1100 |
| Vibration Test | B | B | B | B | A | A |
| Drop Test | B | B | B | B | B | B |
| Separatability for Recycling Used Material | A | A | A | A | D | D |
| Paper: | 0 g/m$^2$ | 0 g/m$^2$ | 0 g/m$^2$ | 0 g/m$^2$ | 70 g/m$^2$ | 70 g/m$^2$ |
| Resin: | 140 μm | 140 μm | 140 μm | 140 μm | 145 μm | 145 μm |
| Cost | | | | | | |
| Number of Process | 1 | 1 | 3 | 5 | 5 | 4 |
| Cost Ratio | 85 | 85 | 95 | 110 | 100 | 100 |

TABLE 3

| Evaluation Item | Comparative example 1 | Comparative example 2 | Comparative example 3 | Comparative example 4 | Comparative example 5 | Comparative example 6 |
|---|---|---|---|---|---|---|
| Dart Method A | | | | | | |
| Outside | 1000 | 900 | 100 or more | 1050 | 900 | 900 |
| Inside (g) | 1050 | 1000 | 1100 or more | 1100 | 1100 | 1100 or more |
| Dart Method B | | | | | | |
| Outside | 450 | 400 | 600 | 500 | 400 | 400 |
| Inside (g) | 470 | 450 | 600 | 500 | 500 | 600 |
| Vibration Test | D | D | C | D | A | A |
| Drop Test | D | D | D | D | D | D |
| Separability for Recycling Used Material | A | A | A | A | D | D |
| Paper: | 0 g/m$^2$ | 0 g/m$^2$ | 0 g/m$^2$ | 0 g/m$^2$ | 70 g/m$^2$ | 70 g/m$^2$ |
| Resin: | 140 μm | 140 μm | 140 μm | 140 μm | 145 μm | 145 μm |
| Cost | | | | | | |
| Number of Process | 1 | 1 | 3 | 5 | 4 | 6 |
| Cost Ratio | 85 | 85 | 95 | 110 | 100 | 110 |

As is apparent by comparing the results of Tables 2 and 3, the packaging materials of Example 1 through 3 of the present invention have improved in terms of strength compared to the packaging materials of Comparative Example 1 through 3. In addition, when the packaging materials of Examples 1 through 3 of the present invention are compared to the packaging materials of Comparative Examples 5 and 6, the packaging materials of Example 1 through 3 of the present invention are superior in terms of strength, cost and recycling property. In addition, the packaging materials of Example 4 through 6 of the present invention have been improved in terms of strength when compared to Comparative Examples 4 through 6.

What is claimed is:

1. A packaging material for a light-sensitive material, said packaging material comprising a multi-layered structure having a polyethylene in an amount of not less than 70% by weight, wherein said multi-layered structure contains an outermost layer as a heat-resistant layer, an intermediate layer and an innermost layer as a heat sealing layer, wherein said intermediate layer has a thickness of 40 to 150 μm, and said intermediate layer has a polyethylene having a molecular weight distribution of 1.5 to 2.4, a density of 0.890 to 0.925 g/cm$^3$ and a melt index of 0.02 to 2.00 g/10 minutes, in an amount of 45 to 90% by weight of said intermediate layer, and wherein said outermost layer comprises polyethylene resin at least 70% by weight of said outermost layer, and said polyethylene resin including a polyethylene having a density of 0.93 to 0.95 g/cm$^3$ and a melt index of 0.02 to 0.05 g/10 minutes.

2. A packaging material for a light-sensitive material comprising first layer and second layer, wherein (a) said first layer is an outermost layer, (b) said first layer comprises polyethylene resin at least 70% by weight of said first layer, and said polyethylene resin including a polyethylene having a density of 0.93 to 0.95 g/cm$^3$ and a melt index of 0.02 to 0.05 g/10 minutes, (c) said second layer comprises a polyethylene having a molecular weight distribution of 1.5 to 2.4 and a density of 0.890 to 0.925 g/cm$^3$ in an amount of 20 to 90% by weight of said second layer.

3. The packaging material of claim 2 wherein said second layer has a thickness of 40 to 150 μm.

4. The packaging material of claim 2 wherein said polyethylene in said second layer has a melt index of 0.02 to 2.00 g/10 minutes.

5. The packaging material of claim 2 wherein said second layer comprises said polyethylene in an amount of 45 to 90% by weight of second layer.

6. The packaging material of claim 2 wherein said second layer comprises said polyethylene in an amount of 38 to 90% by weight of second layer.

7. The packaging material of claim 2 further comprising third layer, wherein said first layer is said outermost layer as heat-resistant layer, said second layer is an intermediate layer and said third layer is innermost layer as heat-sealing layer.

* * * * *